(12) United States Patent
Otsuka

(10) Patent No.: US 8,797,576 B2
(45) Date of Patent: Aug. 5, 2014

(54) IMAGE PROCESS APPARATUS

(75) Inventor: Masashi Otsuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 572 days.

(21) Appl. No.: 13/091,208

(22) Filed: Apr. 21, 2011

(65) Prior Publication Data

US 2011/0261415 A1 Oct. 27, 2011

(30) Foreign Application Priority Data

Apr. 22, 2010 (JP) ................. 2010-098395

(51) Int. Cl.
*G06F 3/12* (2006.01)
*G06F 15/16* (2006.01)
*G06K 15/00* (2006.01)
*H04N 1/00* (2006.01)
*H04N 1/32* (2006.01)
*H04M 11/00* (2006.01)

(52) U.S. Cl.
USPC ........ 358/1.15; 358/1.13; 358/1.16; 358/400; 358/402; 358/442; 379/100.08; 379/100.12; 379/100.13; 709/205; 709/206; 709/249; 709/250

(58) Field of Classification Search
USPC .............. 358/1.6, 3.24, 1.13, 1.15, 1.16, 401, 358/402, 403, 407, 442, 448, 400; 709/205, 709/206, 249, 250; 379/100.08, 100.12, 379/100.13
See application file for complete search history.

(56) References Cited

U.S. PATENT DOCUMENTS

| 6,230,189 | B1 * | 5/2001 | Sato et al. ..................... 709/206 |
| 6,374,291 | B1 * | 4/2002 | Ishibashi et al. .............. 709/206 |
| 6,510,438 | B2 * | 1/2003 | Hasegawa ............................ 1/1 |
| 6,687,742 | B1 * | 2/2004 | Iwazaki ....................... 709/206 |
| 6,877,031 | B2 * | 4/2005 | Watanabe et al. ............. 709/217 |
| 7,224,491 | B2 * | 5/2007 | Shinchi et al. ................ 358/400 |
| 7,283,272 | B2 * | 10/2007 | Johnson et al. .............. 358/1.15 |
| 7,454,441 | B2 * | 11/2008 | Shibata et al. ........................ 1/1 |
| 7,548,993 | B2 * | 6/2009 | Koguchi ....................... 709/250 |
| 7,616,336 | B2 * | 11/2009 | Nakamura ................... 358/1.15 |
| 8,150,921 | B2 * | 4/2012 | Katsuda ........................ 709/206 |

(Continued)

FOREIGN PATENT DOCUMENTS

| JP | 07-182214 A | 7/1995 |
| JP | 2004-350032 A | 12/2004 |
| JP | 2005-100223 A | 4/2005 |

(Continued)

*Primary Examiner* — Firmin Backer
*Assistant Examiner* — Jonathan Beckley
(74) *Attorney, Agent, or Firm* — Panitch Schwarze Belisario & Nadel LLP

(57) ABSTRACT

An invented image processing apparatus includes an image data storing unit for storing image data in a prescribed file format, an image data information producing unit for producing, in response to a request from a user, image data information corresponding to the image data stored in the image data storing unit, a requested format entering unit for entering a requested format of the image data designated by the user from the image data information, and a transmitting unit for transmitting the image data corresponding to the requested format. A user can obtain the image data stored in the prescribed file format with user's desired file format.

6 Claims, 17 Drawing Sheets

(56) References Cited

U.S. PATENT DOCUMENTS

| | | | |
|---|---|---|---|
| 8,407,293 B2 * | 3/2013 | Inoue et al. | 709/206 |
| 2002/0156923 A1 * | 10/2002 | Tanimoto | 709/246 |
| 2005/0206947 A1 * | 9/2005 | Kitahara et al. | 358/1.15 |
| 2005/0278412 A1 * | 12/2005 | Iida | 709/201 |
| 2008/0046518 A1 * | 2/2008 | Tonnison et al. | 709/206 |
| 2010/0198927 A1 * | 8/2010 | Tonnison et al. | 709/206 |

FOREIGN PATENT DOCUMENTS

| | | |
|---|---|---|
| JP | 2005-209045 A | 8/2005 |
| JP | 2006-135570 A | 5/2006 |
| JP | 2007-257612 A | 10/2007 |

* cited by examiner

F I G . 1
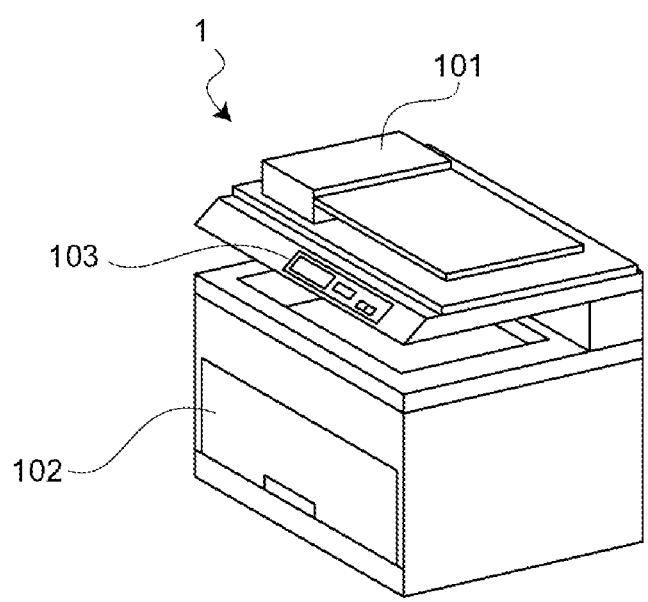

F I G . 4
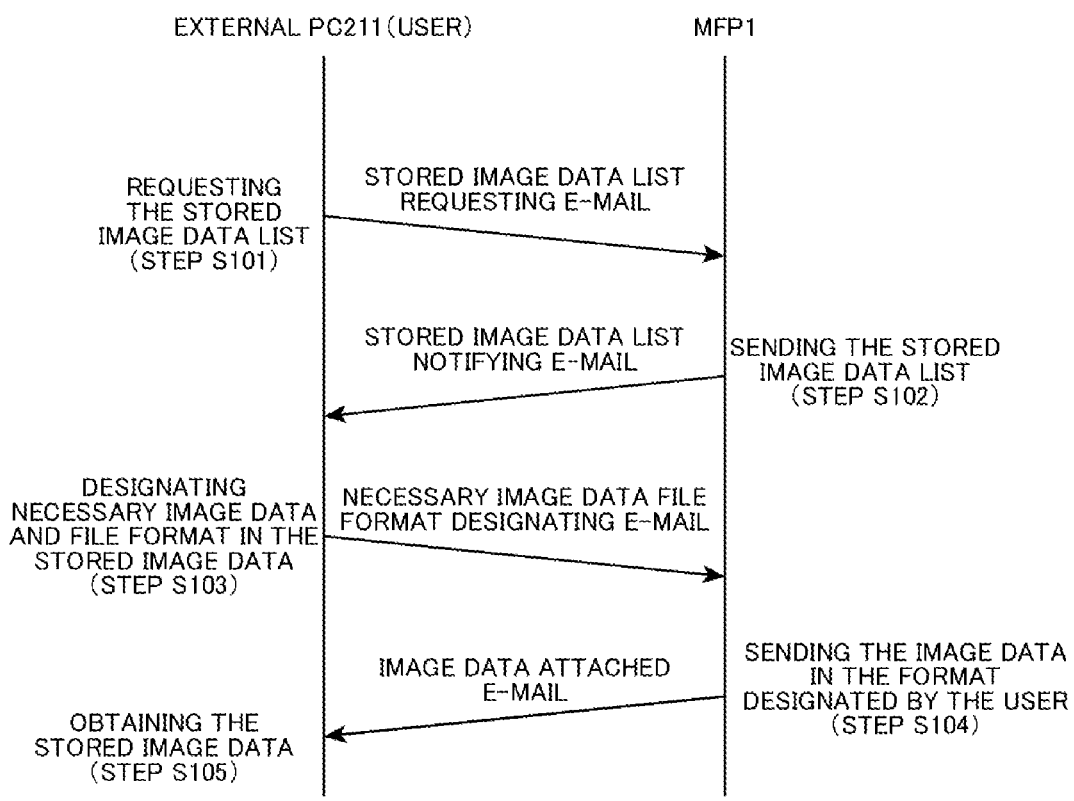

F I G . 6
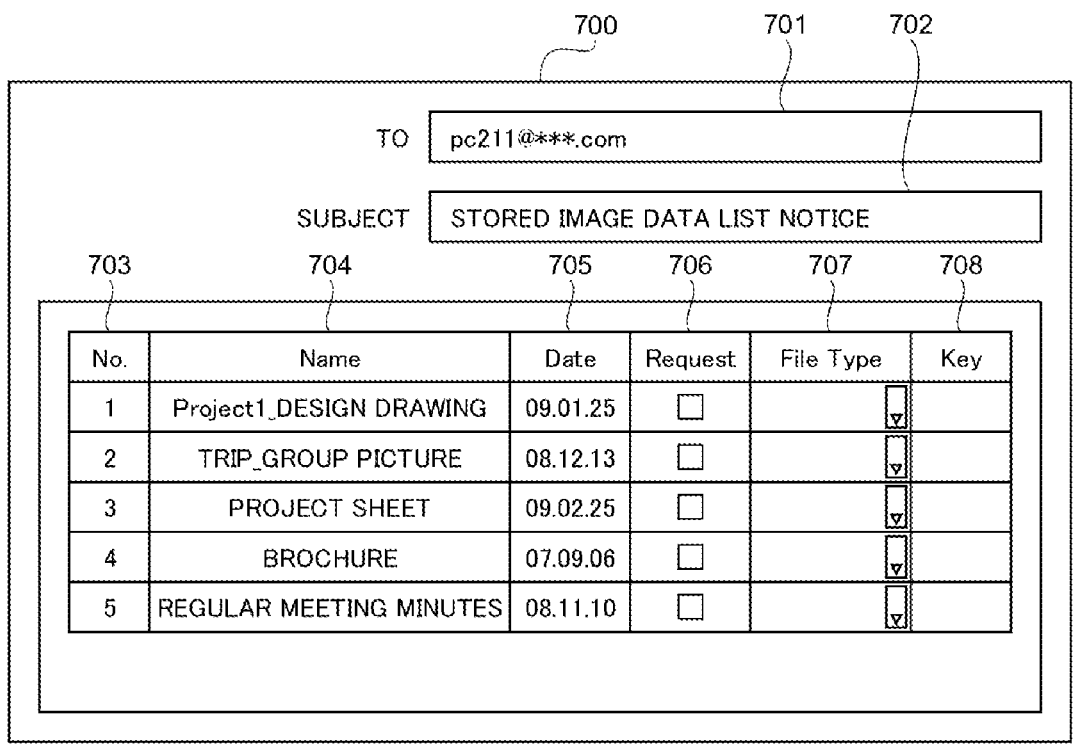

F I G . 7 a

| No. | Name | Date | Request | File Type | Key |
|---|---|---|---|---|---|
| 1 | Project1_DESIGN DRAWING | 09.01.25 | ☐ | ▽ | |
| 2 | TRIP_GROUP PICTURE | 08.12.13 | ☒ | ▽ | |
| 3 | PROJECT SHEET | 09.02.25 | ☐ | ▽ | |
| 4 | BROCHURE | 07.09.06 | ☐ | ▽ | |
| 5 | REGULAR MEETING MINUTES | 08.11.10 | ☐ | ▽ | |

TO: mfp1@***.com
SUBJECT: Re: STORED IMAGE DATA LIST NOTICE

F I G . 7 c

| No. | Name | Date | Request | File Type | Key |
|---|---|---|---|---|---|
| 1 | Project1_DESIGN DRAWING | 09.01.25 | ☐ | ▽ | |
| 2 | TRIP_GROUP PICTURE | 08.12.13 | ☒ | JPEG ▽ | |
| 3 | PROJECT SHEET | 09.02.25 | ☐ | ▽ | |
| 4 | BROCHURE | 07.09.06 | ☐ | ▽ | |
| 5 | REGULAR MEETING MINUTES | 08.11.10 | ☐ | ▽ | |

TO: mfp1@***.com

SUBJECT: Re: STORED IMAGE DATA LIST NOTICE

F I G . 8
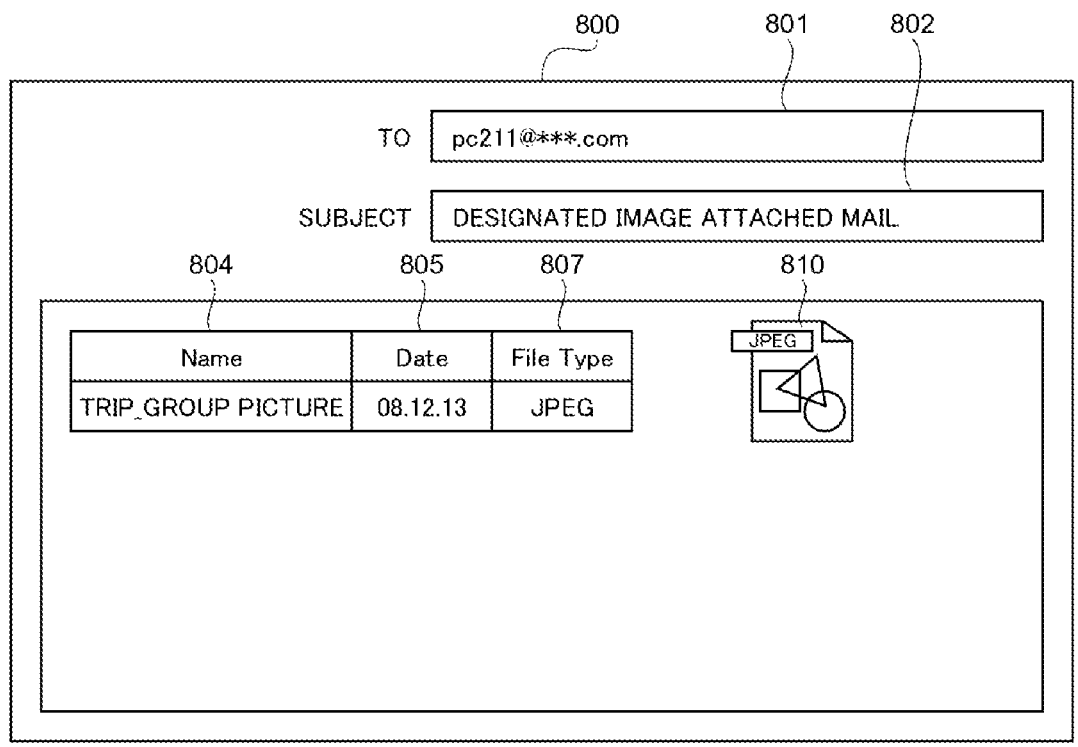

FIG.12a

| No. | Name | Date | Request | File Type (Size) | Key |
|---|---|---|---|---|---|
| 1 | Project1_DESIGN DRAWING | 09.01.25 | ☐ | ▽ | |
| 2 | TRIP_GROUP PICTURE | 08.12.13 | ☒ | ▽ | |
| 3 | PROJECT SHEET | 09.02.25 | ☐ | ▽ | |
| 4 | BROCHURE | 07.09.06 | ☐ | ▽ | |
| 5 | REGULAR MEETING MINUTES | 08.11.10 | ☐ | ▽ | |

TO: mfp1@***.com

SUBJECT: Re: STORED IMAGE DATA LIST NOTICE

F I G . 1 2 b

| No. | Name | Date | Request | File Type (Size) | Key |
|---|---|---|---|---|---|
| 1 | Project1_DESIGN DRAWING | 09.01.25 | ☐ | | |
| 2 | TRIP_GROUP PICTURE | 08.12.13 | ☒ | PDF(410KB) | |
| 3 | PROJECT SHEET | 09.02.25 | ☐ | JPEG(400KB) | |
| 4 | BROCHURE | 07.09.06 | ☐ | TIFF(5MB) | |
| 5 | REGULAR MEETING MINUTES | 08.11.10 | ☐ | BMP(6MB) | |

TO  mfp1@***.com
SUBJECT  Re: STORED IMAGE DATA LIST NOTICE

F I G. 1 2 c
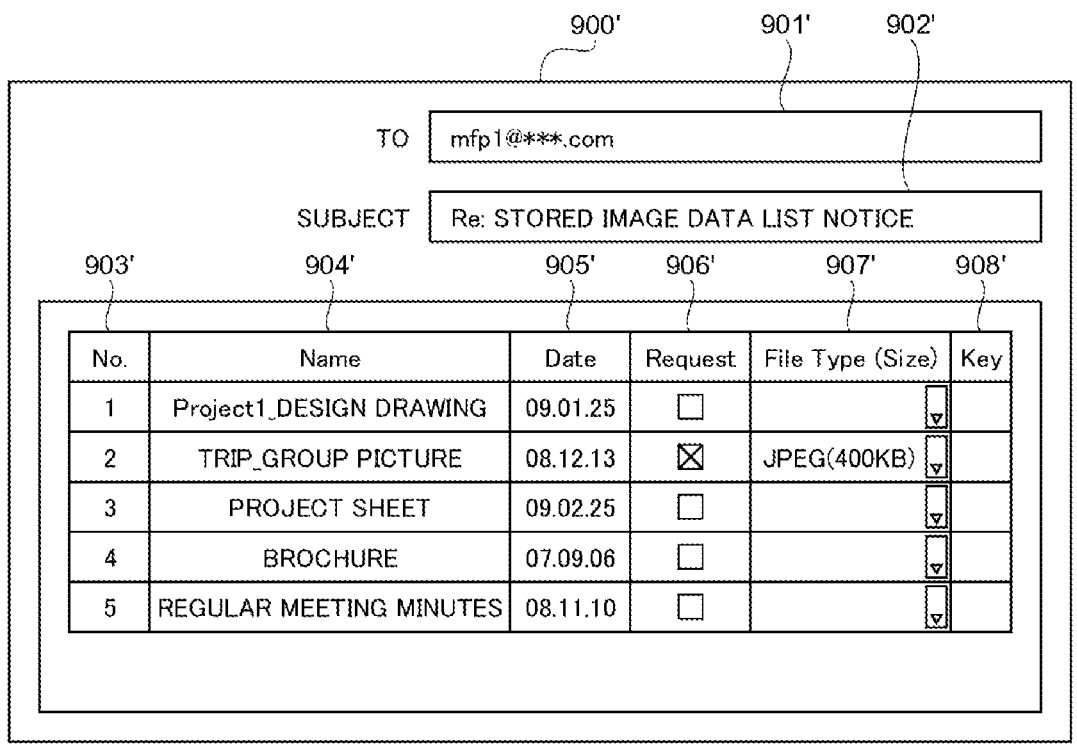

F I G . 1 3
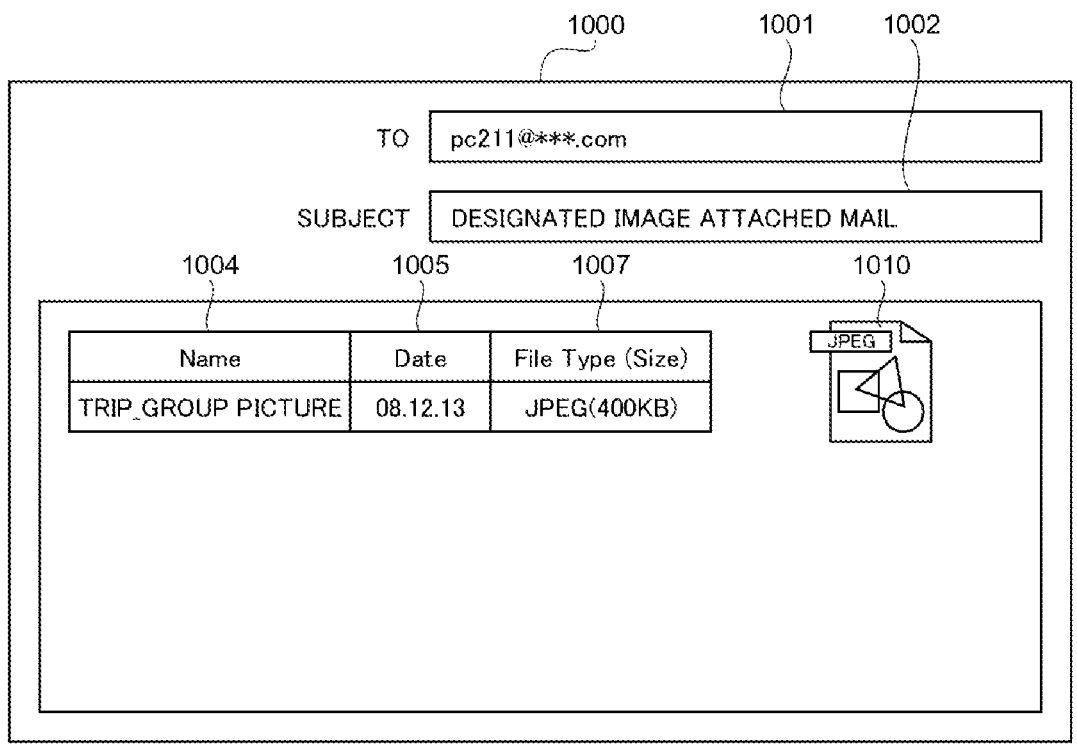

IMAGE PROCESS APPARATUS

BACKGROUND OF THE INVENTION

1. Field of the Invention

This invention relates to an image processing apparatus having functions such as, e.g., a scanner function, and a facsimile function and performing prescribed processing to entered image data.

2. Description of Related Art

A known conventional image processing apparatus allows a user to choose image data and to obtain the chosen image data. With such a prior art, however, the user also may not obtain the image data in a desired file format.

Specific embodiments of this invention are made in consideration of such a background, and it is an object of the specific embodiment of the invention to provide an image processing apparatus allowing a user to obtain, with his desired file format, image data stored with a prescribed file format.

BRIEF SUMMARY OF THE INVENTION

To solve the above problem, an image processing apparatus according to a specific embodiment of the invention includes: an image data storing unit for storing image data in a prescribed file format; an image data information producing unit for producing, in response to a request from a user, image data information corresponding to the image data stored in the image data storing unit; a requested format entering unit for entering a requested format of the image data designated by the user from the image data information; and a transmitting unit for transmitting the image data corresponding to the requested format.

As another aspect of the specific embodiment of the invention, an image processing method comprising the steps of: storing image data with a prescribed file format; receiving a request of information of the stored image data by way of an email; producing information of the image data on the basis of the request; transmitting an email including the produced information of the image data; receiving and analyzing a returned email indicating the information of the image data; selecting the requested image data out of the stored image data according to an analyzed result; and transmitting the selected image data with the requested file format to a requester.

According to the specific embodiment of the invention, the image processing apparatus is capable of obtaining, with user's desired file format, the image data stored with a prescribed file format.

BRIEF DESCRIPTION OF THE SEVERAL VIEWS OF THE DRAWINGS

The above and other features and utilities of the present general inventive concept will become more apparent by describing in detail exemplary embodiments thereof with reference to the attached drawings in which:

FIG. 1 is an overview of an MFP (multifunction peripheral) according to the first embodiment of the invention for the purpose of illustrating the structure thereof;

FIG. 4 is a flowchart for illustrating operation that a user obtains image data with his desired file format;

FIG. 6 is a diagram showing an example of a stored image data list notifying email;

FIGS. 7a to 7c are diagrams illustrating an example of manipulation of a necessary image data file format designating email;

FIG. 8 is a diagram showing an example of an email attaching the image data;

FIGS. 12a to 12c are diagrams illustrating an example of manipulation of a necessary image data file format designating email; and FIG. 13 is a diagram showing an example of an email attaching the image data.

DETAILED DESCRIPTION OF THE PREFERRED EMBODIMENTS

Figure 2:
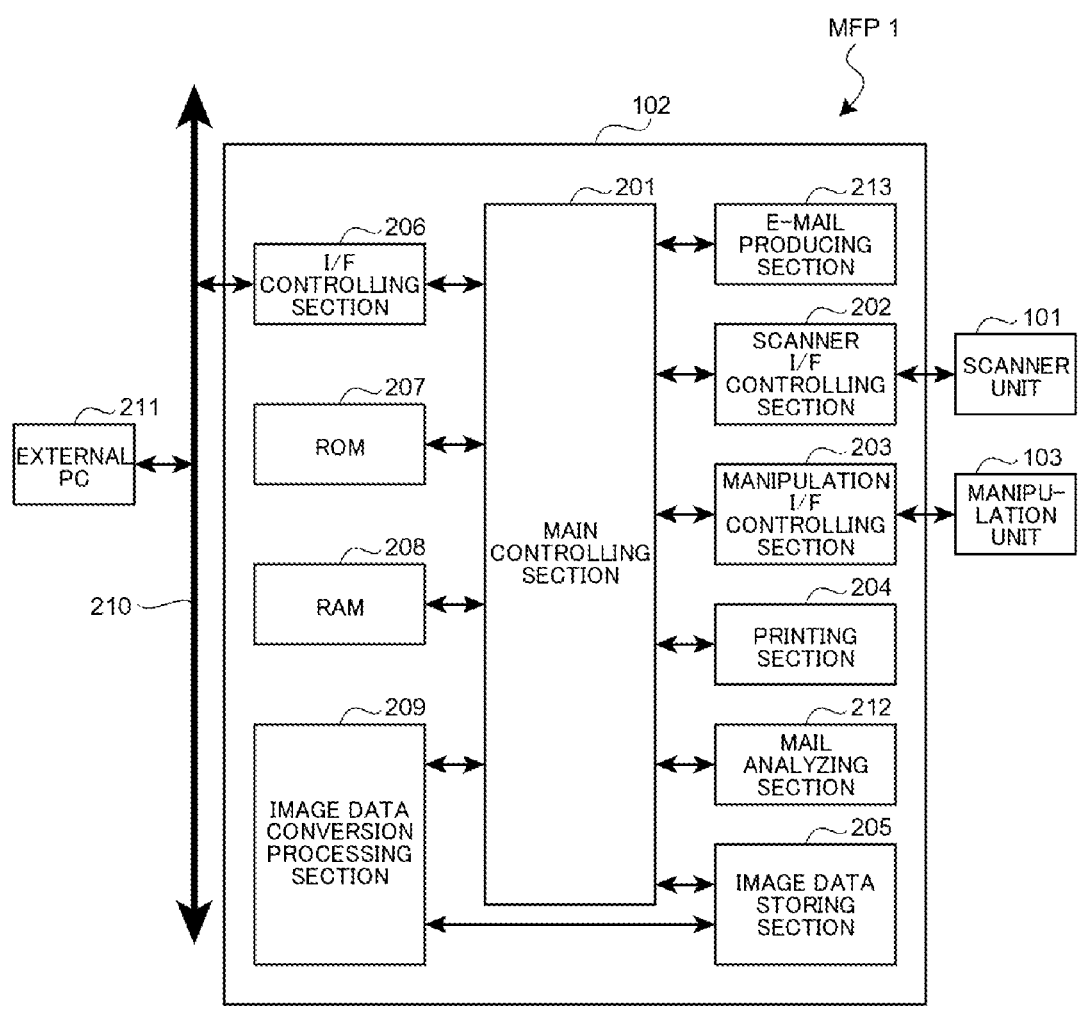
FIG. 2 is a block diagram for illustrating functional structure of the MFP.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures. It is to be noted that the present invention is not limited to the following embodiments and can be appropriately changed without departing from the spirit and scope of the invention.

First Embodiment

FIG. 1 is an overview showing a structure of an MFP (multifunction peripheral) as an image processing apparatus according to this embodiment.

The MFP 1 includes a scanner unit 101 having an automatic feeder that conveys original documents to be read with a prescribed conveyance rate and reading the images on the original documents with a prescribed definition to produce image data based on the image, a printer unit 102 for printing, on a recording medium, the images based on the image data produced with the scanner unit 101, for storing the image data, and for transmitting and receiving the data to and from external information terminal apparatuses, and a manipulation unit 103 for receiving information entered by users and displaying such as, e.g., statues of the apparatus.

The scanner unit 101 can read images from original documents and produce image data based on the images. The scanner unit 101 includes, at least such as, a light source for emitting light to the original documents, a lens system for converging the light reflected by the original documents, a reading unit for performing photoelectric conversion of the light converged by the lens system and having a photoelectric conversion element generating a voltage according to the image, an automatic feeder for conveying the original documents to be read to the reading unit, and an original document plate on which the original documents to be read are loaded.

The printer unit 102 includes, e.g., a printing section of an electrophotographic method and does printing image data produced by the scanner unit 101 on the recording medium, storing the image data to the image data storing section, and transmitting and receiving data to and from external information terminal apparatuses. The printer unit 102 will be described in detail below.

The manipulation unit 103 includes, e.g., an information input means such as a touch panel, not shown, and an information display means such as a liquid crystal display, not shown. The manipulation unit 103 receives information entered by users through the information input means and displays operation status of the MFP 1 through the information display means and information of other various types. More specifically, the manipulation unit 103 is capable of, e.g., executing reading operation of the scanner unit 101, outputting of the image data to the printer unit 102, and deciding and changing the name of the image data stored in an image data storing section 205.

FIG. 2 is a block diagram for illustrating functional structure of the MFP 1. The structure of the printer unit 102 is mainly described herein.

The printer unit 102 includes a main controlling section 201, a scanner I/F controlling section 202, a manipulation unit I/F controlling section 203, a printing section 204, the image data storing section 205, an I/F controlling section 206, a ROM (Read Only Memory) 207, a RAM (Random Access Memory) 208, an image data conversion processing section 209, a mail analyzing section 212, and an email producing section 213, and connected to an external PC (Personal Computer) 211 via a data communication bus 210.

The main controlling section 201 includes a central processing device such as, e.g., a CPU (Central Processing Unit), and controls integrally the whole MFP 1 based on a control program stored in the ROM 207.

The scanner I/F controlling section 202 controls operation of the scanner unit 101 based on the instructions from the main controlling section 201 and outputs the image data produced with the scanner unit 101.

The manipulation unit I/F controlling section 203 controls operation of the manipulation unit 103 based on the instructions from the main controlling section 201. More specifically, the manipulation unit I/F controlling section 203 outputs to the main controlling section 201 the information entered by the user through the information input means not shown, and displays operation status of the MFP 1 through the information display means, not shown, based on the instructions from the main controlling section 201 and information of other various types.

The printing section 204 includes at least a printing engine of electrophotographic method or thermal printing method, and prints on a recording medium, e.g., images based on the image data produced by the scanner unit 101 and the image data transmitted from the external PC 211.

The image data storing section 205 includes, e.g., a rewritable memory device such as a HDD (hard disc drive) or a flash memory, and stores image data produced by the scanner unit 101 and image data received from the external PC 211, on the bit basis, or namely, with BMP (bitmap image) format.

The I/F controlling section 206 is connected to the data communication bus 210 and controls image data associated with the external PC 211 and transmissions and receptions of emails. The I/F controlling section 206 serves as a receiving unit for receiving emails as well as a transmitting unit for transmitting emails. The operation commands of the MFP 1 transmitted from the external PC 211 are received through the I/F controlling section 206 and outputted to the main controlling section 201.

The ROM 207 is a nonvolatile memory device storing such as, e.g., control programs of MFP 1 executed by the main controlling section 201. The RAM 208 functions as a temporary storage for the image data and as a working area for execution of the control programs of the main controlling section 201.

The email producing section 213 produces an email having a list of stored image data information produced at the image data conversion processing section 209, more particularly, at a stored image list production section 304 as described below. The email producing section 213 sends the produced email to the main controlling section 201, and the main controlling section 201 sends the email having the list to the external PC 211 by way of the I/F controlling section 206.

The image data conversion processing section 209 converts image data in the BMP format stored in the image data storing section 205 into the data in a user's desired file format. The image data conversion processing section 209 will be described later.

The data communication bus 210 is an electric signal line for connecting the MFP 1 with the external PC 211, and a LAN (local area network) cable is used for the bus 210 in this embodiment.

The external PC 211 is an external information terminal apparatus used for the user, and includes at least a memory device for memorizing basic software as represented by an operating system, software such as email software operating on the basic software, and various data such as image data, a CPU executing the software, input devices such as a keyboard receiving entries of information from the user and a mouse, and a display device such as a CRT (cathode ray tube) display or a LCD displaying information entered by the user and operation statuses of the MFP 1.

The mail analyzing section 212 serving as a request analyzing unit does analyses and judgments as to whether the contents of the email received by the MFP 1 is for requesting a list of image data information corresponding to the image data stored in the image data storing section 205, and as to whether the contents include designation of the file format of the image data desired by the user where image data desired to be obtained are chosen through selection of the image data information. It is to be noted that analysis and judgment done by the mail analyzing section 212 is made with "Subject" of the received email in this embodiment. More specifically, the mail analyzing section 212 judges that it is a list requesting email of the image data information (hereinafter such an email is referred to as "stored image data list requesting email.") if finding a request for a list in the subject of the email, and chooses the image data desired to be obtained by the user to judge that it is an email designating the file format of the image data desired by the user (hereinafter such an email is referred to as "necessary image data file format designating email.") if finding it is an returned email sent to the user from the MFP 1.

Figure 3:
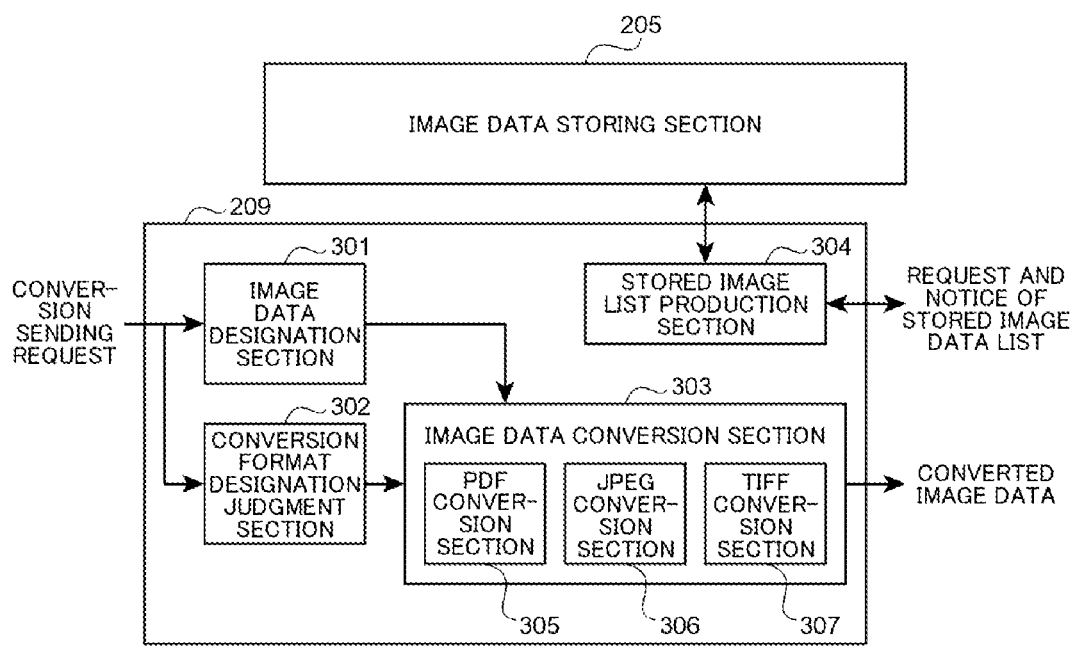
FIG. 3 is a block diagram showing an internal functional structure of an image data conversion processing section according to the first embodiment of the invention.

The image data conversion processing section 209 is described next. FIG. 3 is a block diagram showing an internal functional structure of an image data conversion processing section 209.

The image data conversion processing section 209 includes an image data designation section 301, a conversion format designation judgment section 302, an image data conversion section 303, and the stored image list production section 304.

The image data designation section 301 serving as a requested format entering unit and also serving as a selection and designation entering unit, selects the image data corresponding to the image data information selected by the user from the image data stored in the image data storing section 205 when the mail analyzing section 212 judges that the received email is the necessary image data file format designating email, and outputs the image data to the image data conversion section 303.

The conversion format designation judgment section 302 serving as the requested format entering unit, judges the file format designated by the user and notifies the image data conversion section 303 of the judged consequence, when the mail analyzing section 212 judges that the received email is the necessary image data file format designating email.

The image data conversion section 303 includes a PDF conversion section 305 for converting the image data in the BMP format stored in the image data stored section 205 into the image data in the PDF (Portable Document Format) format, a JPEG conversion section 306 for converting the stored image data in the BMP format into the image data in the JPEG (Joint Photographic Experts Group) format, and a TIFF conversion section 307 for converting the stored image data in the BMP format into the image data in the TIFF (Tagged Image File Format) format. The image data conversion section 303 converts the image data entered with the image data designation section 301 into the data in the format notified from the conversion format designation judgment section 302.

The stored image list production section 304 serving as an image data information producing unit, which is also serving as an image data information list production section, forms a list of the image data stored in the image data storing section 205 to make a stored image data list. The contents formed in the listed manner in the stored image data list include name of the corresponding image data, and date and time information stored in the image data storing section 205.

Thus, the image data converted into the data in the file format desired by the user at the image data conversion section 303, and the stored image data list produced at the stored image list production section 304 can be sent to the external PC 211 by an email through the I/F controlling section 206 based on the control by the main controlling section 201.

In operation of the MFP 1 according to the first embodiment of the invention, FIG. 4 is a flowchart for illustrating operation up to that a user obtains image data with his desired file format.

Figure 5:
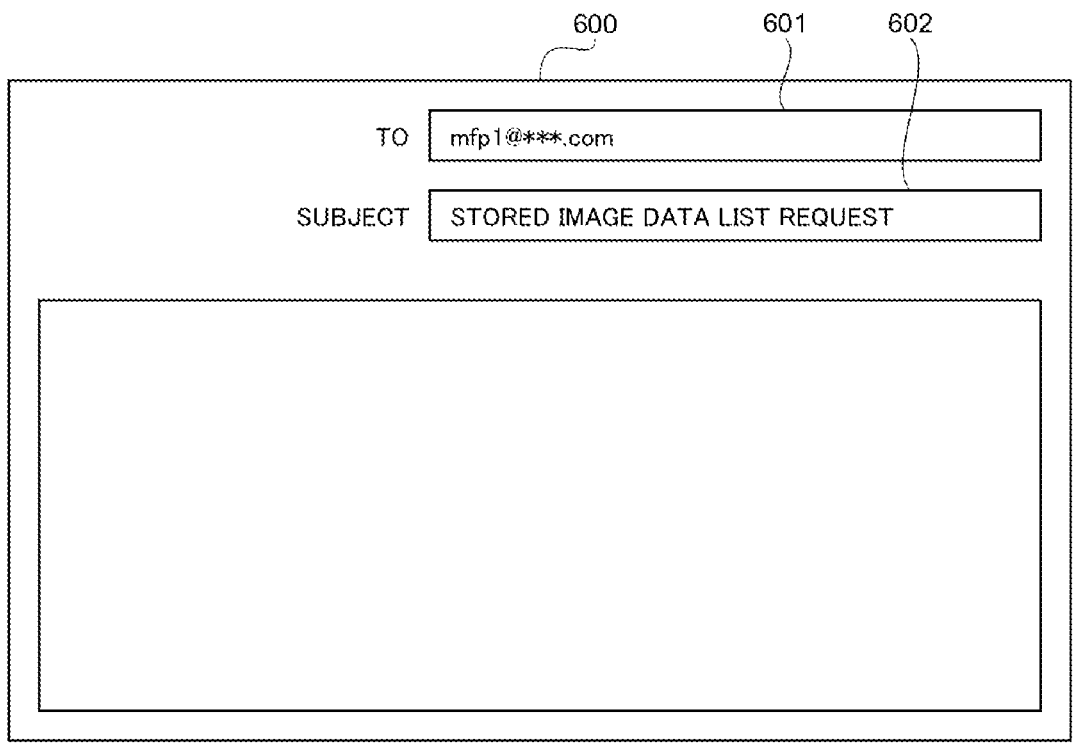
FIG. 5 is a diagram showing an example of a request email for a list of stored image data.

First, the user using the external PC 211 sends a stored image data list requesting email to MFP 1 using mailer software, not shown, to know the image data stored in the MFP 1. FIG. 5 is a schematic view illustrating an example of the stored image data list requesting email. As shown in FIG. 5, the stored image data list requesting email 600 is a blank mail constituted of a to (address) box 601 and a subject box 602, and in this embodiment, the to box 601 is entered with "mfp1@***.com" as the receiving address of the email of the MFP 1, while the subject box 602 is entered with "stored image data list request" representing contents for requesting a list of the image data information corresponding to the image data stored in the image data storing section 205 of the MFP 1.

Where an email sent from the external PC 211 is received by way of the I/F controlling section 206, the main controlling section 201 of the MFP 1 outputs the received email to the mail analyzing section 212. The mail analyzing section 212 does analysis and judgment of the entered email. More specifically, the mail analyzing section 212 analyzes the subject of the entered email and judges as to whether the subject box has the term of "list request." In a case that the received email is the stored image data list requesting email 600 as described above, the mail analyzing section 212 analyzes the subject box 602, and where confirming that the entered contents at the subject box 601 are the "stored image data list request," the mail analyzing section 212 judges that the user requests the list of the image data information corresponding to the image data stored in the image data storing section 205 of the MFP 1 and notifies the main controlling section 201 of that message.

To the contrary, if the received email is not the stored image data list requesting email 600 as described above, or namely if the term of "list request" cannot be confirmed as a result of the analysis of the subject box of the email, the mail analyzing section 212 notifies the main controlling section 201 of the judgment in which the user did not request the list of the image data information corresponding to the image data stored in the image data storing section 205 of the MFP 1. The main controlling section 201 notifies the user of that message by an email through the I/F controlling section 206.

Where the main controlling section 201 receives the notice upon the judgment of the mail analyzing section 212 in which the user requests the list of the image data information corresponding the image data stored in the image data storing section 205 of the MFP 1, the main controlling section 201 begins operation responding to the user's request. More specifically, the main controlling section 201 provides to the image data conversion processing section 209 an instruction for producing the stored image data list of the image data stored in the image data storing section 205.

The stored image data list production section 304 in the image data conversion processing section 209 receiving the instruction from the main controlling section 201 makes a list of the image data stored in the image data storing section 205, thereby producing the stored image data list. The email producing section 213 produces an email setting forth the stored image data list made at the stored image data list production section 304 to be sent to the user. The produced email is sent to the external PC 211 via the I/F controlling section 206 (step S102 in FIG. 4).

FIG. 6 is a diagram showing an example of a stored image data list notifying email produced at the email producing section 213, to be sent to the external PC 211. As shown in FIG. 6, the stored image data list notifying email 700 is constituted of a to (address) box 701, a subject box 702, an image data number column 703, an image data name column 704, a stored date column 705, an image data selection check box column 706, a file format designation pull down menu column 707, and a key designation box column 708.

The to box 701 is entered with an address "pc211@***.com" as the email receiving address of the user at the PC 211. The subject box 702 is entered with the term "stored image data list notice" representing that the described contents of the email sent from the MFP 1 are the list of the stored image data.

The image data number column 703 has cells assigned with respective serial numbers, each of which is given to each image data stored in the image data stored section 205. There is no restriction on assignment of the serial numbers, and can be modified in a proper way such as, e.g., the sequence of date stored in the image data storing section 205, and the alphabetical order of the image data names.

The image data name column 704 has cells including the names given in corresponding to the respective image data stored in the image data storing section 205. The name in the image data name column 704 can be set and modified with the manipulation unit 103. The respective image data names displayed in the cells of the image data name column 704 can be corresponded to the stored addresses of the image data in the image data storing section 205. That is, at a timing that the image data name corresponding to the image data desired to be obtained by the user is selected or in a mouse-over state using an input means such as a mouse or the like, not shown, the contents of the corresponding image data are displayed in a preview format, thereby improving the usage for the users, as well as preventing the users from mistakenly selecting the image data in advance.

The stored date column 705 has the cells displaying date information such as, e.g., stored date on which the respective image data are stored in the image data storing section 205, edited date of the image data, or changed data of the image data names.

The image data selection check box column 706 has check boxes receiving the selection of the image data that the user desires to obtain. Image data selecting operation by the user will be described later.

The file format designation pull down menu column 707 has cells each including a pull down menu for entering the designation of the file format of the image data that the user wants. File format designation operation of the image data by the user will be described later.

The key designation box column 708 has cells each having a box for entering strings designated by the user. If the user enters a string in a cell of the key designation box column 708, where the image data are selected with the check at the cell of the image data selection check box column 706 and where its file format is designated at the cell of the file format designation pull down menu column 707, image data of a page containing the string entered in the cell of the key designation box column 708 only can be outputted.

Subsequently, with respect to the stored image data list notifying email 700 thus constituted, selection operation of the image data that the user desires to obtain and designation operation of the desired file format will be described herein. It is to be noted that in this embodiment the selection operation and the designation operation are performed in use of a necessary image data file format designating email 700' as an email responding to the stored image data list notifying email 700. The same reference numbers illustrated in FIG. 6 are given to substantially the same structural portions in FIGS. 7(*a*), 7(*b*) with addition of an apostrophe mark ('), and their duplicated descriptions are omitted for the sake of simplicity.

At step S102 in FIG. 4, when the user receives the stored image data list notifying email 700 sent from the MFP 1, the user executes the election operation of the image data to be obtained and the designation operation of the desired file format by a form of responding the received stored image data list notifying email 700 (step S103 in FIG. 4).

Figure 7B:
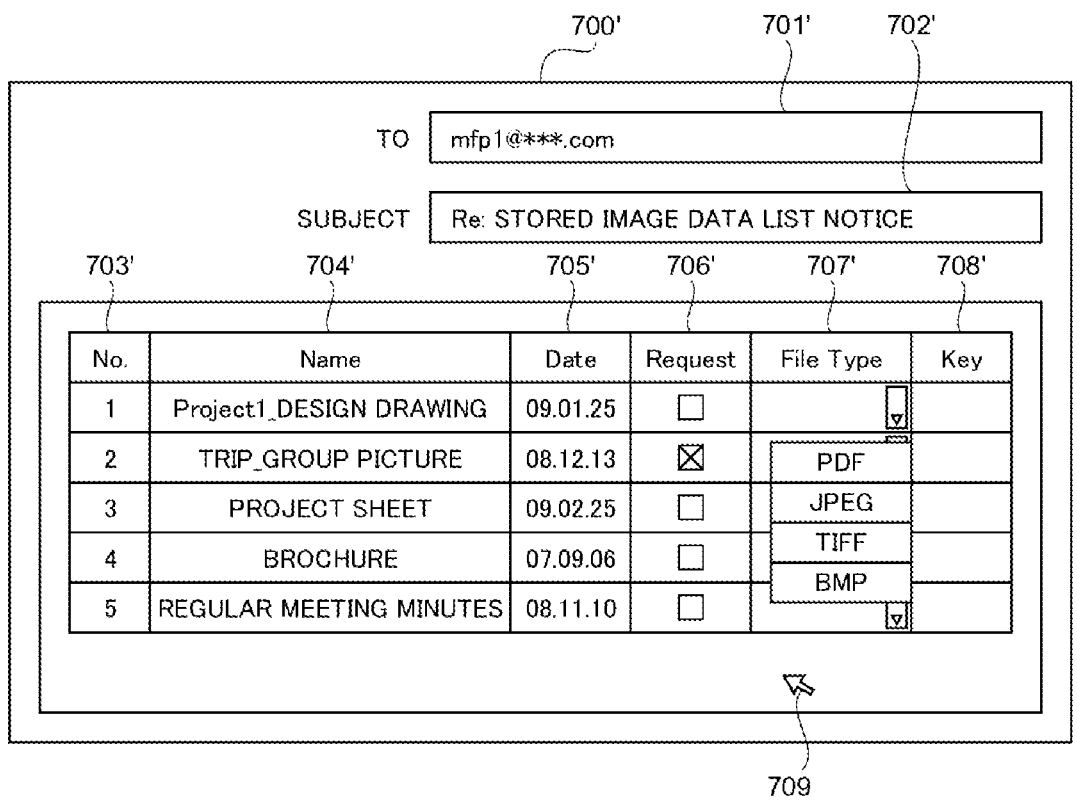

More specifically, as shown in FIG. 7(*a*), the user selects the check box of the image data selection check box column 706' corresponding to the image data that the user desires to obtain, using an input means, not shown, such as, e.g., a mouse. A check mark is displayed at the selected check box of the image data selection check box column 706', thereby showing that the user selects the incident image data. It is to be noted that checking to the check box in the image data selection check box column 706' is a manipulation on the external PC 211 used by the user, and such checking is made by clicking with a mouse cursor 709 the image data selection check box in the check box column 706' on the necessary image data file format designating email 700' displayed on a display apparatus not shown.

Next, as shown in FIG. 7(*b*), the user designates any desired file format from the file formats of the PDF format, the JPEG format, the TIFF format, and the BMP format displayed on the pull down menu of the file format designation pull down menu column 707'. The designation of the file format on cells of the file format designation pull down menu column 707' is a manipulation on the external PC 211 used by the user, and such designation is made by clicking with the mouse cursor 709 any file format of the PDF format, the JPEG format, the TIFF format, and the BMP format displayed on the pull down menu of the file format designation pull down menu column 707' on the necessary image data file format designating email 700' displayed on a display apparatus not shown.

FIG. 7(*c*) shows a displaying example of the necessary image data file format designating email 700' on which the user's selection operation for the image data desired to be obtained and designation operation for desired file format are performed. In FIG. 7(*c*), the image data having the number 2 at the image data number column 703' and "Trip Group Picture" at the image data name column 704' are selected by the user, the JPEG file format is designated as the file format. It is to be noted that where the user enters a prescribed string in the cell of the key designation box column 708', image data corresponding to a page containing the prescribed string among the image data corresponding to the image data name having "Trip Group Picture" only can be outputted, though it is not shown.

The user's selection operation for the image data desired to be obtained and designation operation for desired file format are performed to produce the necessary image data file format designating email 700', and then, the external PC 211 transmits the necessary image data file format designating email 700' as an email to the MFP 1.

When receiving the email transmitted from the external PC 211 via the I/F controlling section 206, the main controlling section 201 of the MFP 1 outputs the received email to the mail analyzing section 212. The mail analyzing section 212 analyzes and judges the given email. More specifically, the mail analyzing section 212 analyzes the subject of the delivered email and judges as to whether the subject includes a description of "Re: stored image data list notice" indicating a responding email to the stored image data list notifying email sent to the external PC 211 from the MFP 1. If the received email is the necessary image data file format designating email 700' as the response of the stored image data list notifying email 700, the mail analyzing section 212 analyzes the subject box 702' and confirms that the entered contents of the subject box 702' includes "Re: stored image data list notice," thereby judging that the user requests the selection of the image data desired to be obtained and the designation of the desired file format, and notifying the main controlling section 201 of this analyzed result.

To the contrary, if the received email is not the necessary image data file format designating email 700', or namely, if not confirming the description of "Re: stored image data list notice" as the analyzing result of the subject of the email, the mail analyzing section 212 notifies the main controlling section 201 of the judgment that the user does not request any selection of the image data desired to be obtained as well as any designation of the desired file format. The main controlling section 201 notifies the user of this result by the email via the I/F controlling section 206.

Where the mail analyzing section 212 judges that the user requests the selection of the image data desired to be obtained and the designation of the desired file format, and where the main controlling section 201 receives the notice, the main controlling section 201 begins operation responding to the request made by the user. More specifically, the main controlling section 201 notifies the image data conversion processing section 209 of the contents described in the necessary image data file format designating email 700'.

The image data designation section 301 of the image data conversion processing section 209 receiving the notice from the main controlling section 201 selects the image data corresponding to the image data information selected by the user out of the image data stored in the image data storing section 205, and output the selected image data to the image data conversion section 303.

The conversion format designation judgment section 302 of the image data conversion processing section 209 receiving the notice from the main controlling section 201 judges the file format designated by the user and notifies the image data conversion section 303 of the judgment consequence.

The image data conversion section 303 receiving the entry of the image data selected by the user and the notice of the file format designated by the user, converts the entered image data in the BMP format into the data in any file format among the PDF format, the JPEG format, and the TIFF format, as notified from the conversion format designation judgment section 302.

The main controlling section 201 attaches the image data converted by the image data conversion section 303 to an email to be sent to the user, and sends the email to the external PC 211 via the I/F controlling section 206 (step S104 in FIG. 4). This email also can be composed at the email producing section 213 as described below.

FIG. 8 shows an example of the email attaching the image data to be sent at that time. The image data attaching email 800 is constituted of a to (address) box 801, a subject box 802, an image data name column 804, a stored date column 805, a file format column 807, and an attached image data icon 810.

The to box 801 is entered with an address "pc211@***.com" as the email receiving address of the user at the PC 211. The subject box 802 is entered with the term "designated image attached email" representing the attachment of the image data in the file format designated by the user to the email sent by the MFP 1.

The image data name column 804 has a cell including the name corresponding to the image data attached to the image data attaching email 800, and normally, displays the same name as the name in the image data name column 704 of the stored image data list notifying mail 700.

The stored date column 805 has a cell displaying date information such as, e.g., stored date on which the original image data before file format change of the image data attached to the image data attaching mail 800 are stored in the image data storing section 205, edited date of the original image data, or changed data of the original image data names. The cell of the stored date column 805 normally displays the same date information as the stored date of the stored image date list notifying mail 700.

The file format column 807 has a cell indicating the file format of the image data attached to the image data attaching mail 800 and designated by the user, and in a normal situation, displays the file format designated by the user at the pull down menu of the file format designation pull down menu column 707 on the stored image data list notifying email 700.

The attached image data icon 810 is an icon displaying the image data in a prescribed file format, e.g., JPEG format, attached to the image data attaching mail 800.

The user at the last stage can obtain the image data converted with the desired file format by receiving the image data attaching mail 800 via the external PC 211 (step S105 in FIG. 4).

Although it is exemplified that the number of the image data selected by the user is single in this embodiment, this invention is not limited to this, and plural number of the image data can be selected on the check box of the image data selection check box column 706' of the necessary image data file format designating email 700' to designate the desired file format or formats, thereby allowing the user to obtain the image data of plural files in the desired file format or formats at the same time.

As described above, according to the first embodiment, because the user can obtain the image data stored in the prescribed file format with user's desired file format, the usability for the user can be improved.

Second Embodiment

The structure of an MFP 1' according to the second embodiment is substantially the same as the structure of the MFP 1 according to the first embodiment. Accordingly, different portions are mostly described in a description of the second embodiment by assigning the same reference numbers to the same portions in the second embodiment to the portions in the first embodiment.

Figure 9:
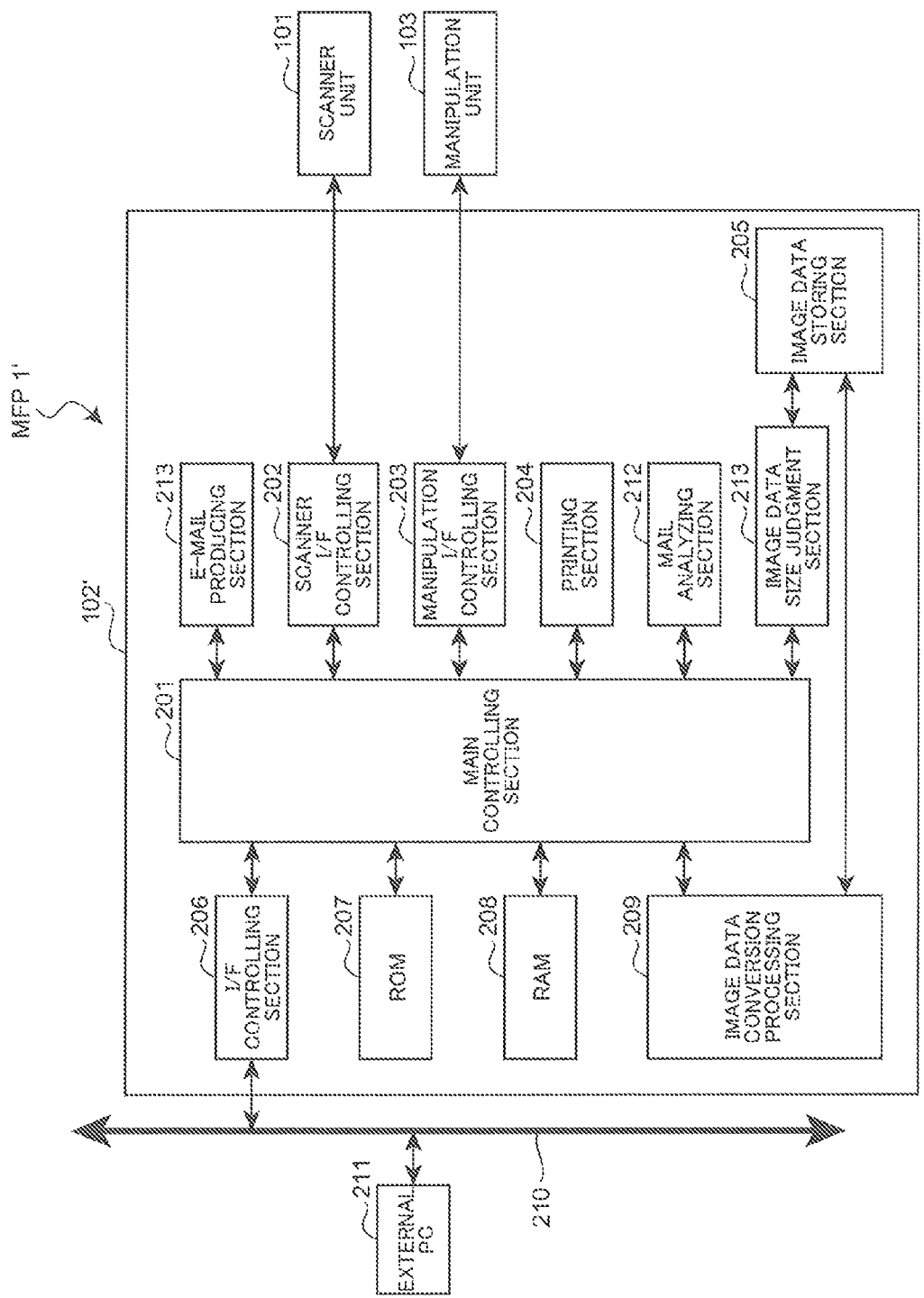
FIG. 9 is a block diagram for illustrating functional structure of the MFP according to the second embodiment of the invention.

FIG. 9 is a block diagram for illustrating functional structure of the MFP 1' according to the second embodiment of the invention. The printer unit 102' in the second embodiment has the same structure as that of the printer unit 102 in the first embodiment and has an image data size judgment section 213 additionally.

Before the image data produced by the scanner unit 101 and the image data received from the external PC 211 are stored as the image data in the BMP format in the image data storing section 205 according to the control done by the main controlling section 201, the image data size judgment section 213 serving as an image data size retrieving unit judges the image data size in a case that the image data are converted into the data having the prescribed file format such as, e.g., PDF format, JPEG format, and TIFF format, and stores the respective image data in the image data storing section 205 corresponding to the judgment consequence. This judgment consequence, or namely, the image data size of each file format is used as one of the contents to be visualized as a list at a time that the stored image list production section 304 produces the stored image data list.

Figure 10:
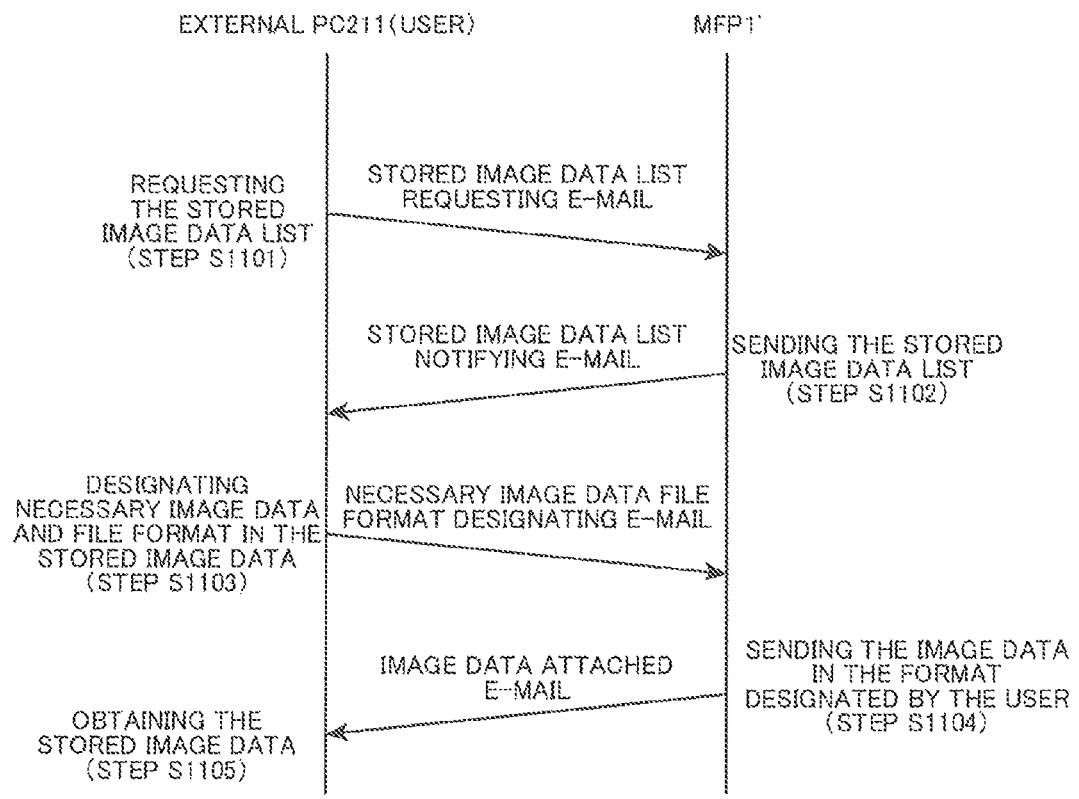
FIG. 10 is a flowchart for illustrating operation that a user obtains image data with his desired file format.

Operation of the second embodiment having such a structure is described next. FIG. 10 is a flowchart for illustrating operation up to that a user obtains image data with his desired file format.

At step S1101 in FIG. 10, the user using the external PC 211 sends a stored image data list requesting email to MFP 1' using mailer software, not shown, to know the image data stored in the MFP 1'. The described contents of the stored image data list requesting email is the same as those in the stored image data list requesting email 600 in the first embodiment, and therefore a description for the contents is omitted.

If receiving the email sent form the external PC 211 via the I/F controlling section 206, the main controlling section 201 of the MFP 1' outputs the received email to the mail analyzing section 212. The mail analyzing section 212 does analysis and judgment of the entered email. More specifically, the mail analyzing section 212 analyzes the subject of the entered email and judges as to whether the subject box has the term of "list request." In a case that the received email is the stored image data list requesting email as described above, the mail analyzing section 212 analyzes the subject box, and where confirming that the entered contents at the subject box are the "stored image data list request," the mail analyzing section 212 judges that the user requests the list of the image data information corresponding to the image data stored in the image data storing section 205 of the MFP 1' and notifies the main controlling section 201 of that message.

To the contrary, if the received email is not the stored image data list requesting email as described above, or namely if the term of "list request" cannot be confirmed as a result of the analysis of the subject box of the email, the mail analyzing section 212 notifies the main controlling section 201 of the judgment in which the user did not request the list of the image data information corresponding to the image data stored in the image data storing section 205 of the MFP 1'. The main controlling section 201 notifies the user of that message by an email through the I/F controlling section 206.

Where the main controlling section 201 receives the notice upon the judgment of the mail analyzing section 212 in which the user requests the list of the image data information corresponding the image data stored in the image data storing section 205 of the MFP 1', the main controlling section 201 begins operation responding to the user's request. More specifically, the main controlling section 201 provides to the image data conversion processing section 209 an instruction for producing the stored image data list of the image data stored in the image data storing section 205.

The stored image data list production section 304 in the image data conversion processing section 209 receiving the instruction from the main controlling section 201 makes a list of the image data stored in the image data storing section 205, thereby producing the stored image data list. The email producing section 213 produces an email setting forth the stored image data list made at the stored image data list production section 304 to be sent to the user. The produced email is sent to the external PC 211 via the I/F controlling section 206 (step S1102 in FIG. 10).

Figure 11:
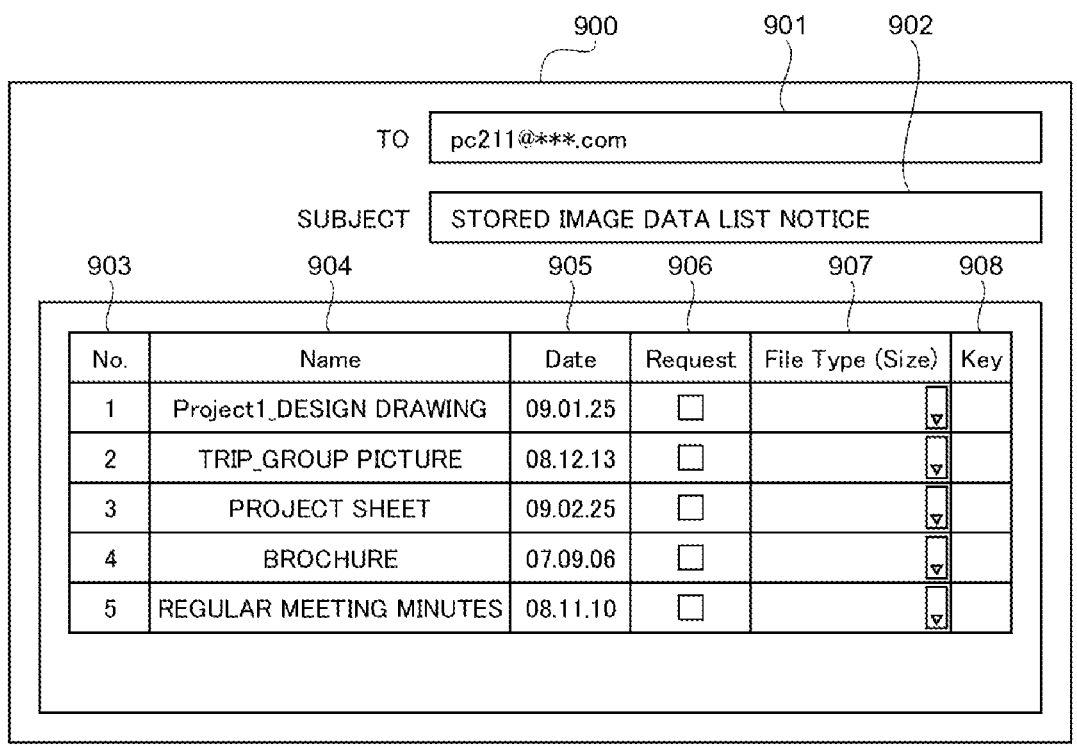
FIG. 11 is a diagram showing an example of a stored image data list notifying email.

FIG. 11 is a diagram showing an example of a stored image data list notifying email, which is sent to the external PC 211. As shown in FIG. 11, the stored image data list notifying email 900 of a to (address) box 901, a subject box 902, an image data number column 903, an image data name column 904, a stored date column 905, an image data selection check box column 906, a file format designation pull down menu column 907, and a key designation box column 908.

The to box 901 is entered with an address "pc211@***.com" as the email receiving address of the user at the PC 211. The subject box 902 is entered with the term "stored image data list notice" representing that the described contents of the email sent from the MFP 1' are the list of the stored image data.

The image data number column 903 has cells assigned with respective serial numbers, each of which is given to each image data stored in the image data stored section 205. There is no restriction on assignment of the serial numbers, and can be modified in a proper way such as, e.g., the sequence of date stored in the image data storing section 205, and the alphabetical order of the image data names.

The image data name column 904 has cells including the names given in corresponding to the respective image data stored in the image data storing section 205. The name in the image data name column 904 can be set and modified with the manipulation unit 103. The respective image data names displayed in the cells of the image data name column 904 can be corresponded to the stored addresses of the image data in the image data storing section 205. That is, at a timing that the image data name corresponding to the image data desired to be obtained by the user is selected or in a mouse-over state using an input means such as a mouse or the like, not shown, the contents of the corresponding image data are displayed in a preview format, thereby improving the usage for the users, as well as preventing the users from mistakenly selecting the image data in advance.

The stored date column 905 has the cells displaying date information such as, e.g., stored date on which the respective image data are stored in the image data storing section 205, edited date of the image data, or changed data of the image data names.

The image data selection check box column 906 has check boxes receiving the selection of the image data that the user desires to obtain. Image data selecting operation by the user will be described later.

The file format designation pull down menu column 907 has cells each including a pull down menu for entering the designation of the file format of the image data that the user wants. File format designation operation of the image data by the user will be described later.

The key designation box column 908 has cells each having a box for entering strings designated by the user. If the user enters a string in a cell of the key designation box column 908, where the image data are selected with the check at the cell of the image data selection check box column 906 and where its file format is designated at the cell of the file format designation pull down menu column 907, image data of a page containing the string entered in the cell of the key designation box column 908 only can be outputted.

Subsequently, with respect to the stored image data list notifying email 900 thus constituted, selection operation of the image data that the user desires to obtain and designation operation of the desired file format will be described herein. It is to be noted that in this embodiment the selection operation and the designation operation are performed in use of a necessary image data file format designating email 900' as an email responding to the stored image data list notifying email 900. The same reference numbers illustrated in FIG. 11 are given to substantially the same structural portions in FIGS. 12(a), 12(b) with addition of an apostrophe mark ('), and their duplicated descriptions are omitted for the sake of simplicity.

At step S1102 in FIG. 10, when the user receives the stored image data list notifying email 900 sent from the MFP 1', the user executes the election operation of the image data to be obtained and the designation operation of the desired file format by a form of responding the received stored image data list notifying email 900 (step S1103 in FIG. 10).

More specifically, as shown in FIG. 12(a), the user selects the check box of the image data selection check box column 906' corresponding to the image data that the user desires to obtain, using an input means, not shown, such as, e.g., a mouse. A check mark is displayed at the selected check box of the image data selection check box column 906', thereby showing that the user selects the incident image data. It is to be noted that checking to the check box in the image data selection check box column 906' is a manipulation on the external PC 211 used by the user, and such checking is made by clicking with a mouse cursor 909 the image data selection check box in the check box column 906' on the necessary image data file format designating email 900' displayed on a display apparatus not shown.

Next, as shown in FIG. 12(b), the user designates any desired file format from the file formats of the PDF format, the JPEG format, the TIFF format, and the BMP format displayed on the pull down menu of the file format designation pull down menu column 907'. The image data sizes in a case where the image data selected with the check box of the image data selection check box column 906' are converted into the respective file formats are also indicated. It is to be noted that the designation of the file format on cells of the file format designation pull down menu column 907' is a manipulation on the external PC 211 used by the user, and such designation is made by clicking with the mouse cursor 909 any file format of the PDF format, the JPEG format, the TIFF format, and the BMP format displayed on the pull down menu of the file format designation pull down menu column 907' on the necessary image data file format designating email 900' displayed on a display apparatus not shown.

FIG. 12(c) shows a displaying example of the necessary image data file format designating email 900' on which the user's selection operation for the image data desired to be obtained and designation operation for desired file format are performed. In FIG. 12(c), the image data having the number 2 at the image data number column 903' and "Trip Group Picture" at the image data name column 904' are selected by the user, the JPEG file format is designated as the file format. It is to be noted that where the user enters a prescribed string in the cell of the key designation box column 908', image data corresponding to a page containing the prescribed string among the image data corresponding to the image data name having "Trip Group Picture" only can be outputted, though it is not shown.

The user's selection operation for the image data desired to be obtained and designation operation for desired file format are performed to produce the necessary image data file format designating email 900', and then, the external PC 211 transmits the necessary image data file format designating email 900' as an email to the MFP 1'.

When receiving the email transmitted from the external PC 211 via the I/F controlling section 206, the main controlling section 201 of the MFP 1' outputs the received email to the mail analyzing section 212. The mail analyzing section 212 analyzes and judges the given email. More specifically, the mail analyzing section 212 analyzes the subject of the delivered email and judges as to whether the subject includes a description of "Re: stored image data list notice" indicating a responding email to the stored image data list notifying email sent to the external PC 211 from the MFP 1'. If the received email is the necessary image data file format designating email 900' as the response of the stored image data list notifying email 900, the mail analyzing section 212 analyzes the subject box 902' and confirms that the entered contents of the subject box 902' includes "Re: stored image data list notice," thereby judging that the user requests the selection of the image data desired to be obtained and the designation of the desired file format, and notifying the main controlling section 201 of this analyzed result.

To the contrary, if the received email is not the necessary image data file format designating email 900', or namely, if not confirming the description of "Re: stored image data list notice" as the analyzing result of the subject of the email, the mail analyzing section 212 notifies the main controlling section 201 of the judgment that the user does not request any selection of the image data desired to be obtained as well as any designation of the desired file format. The main controlling section 201 notifies the user of this result by the email via the I/F controlling section 206.

Where the mail analyzing section 212 judges that the user requests the selection of the image data desired to be obtained and the designation of the desired file format, and where the main controlling section 201 receives the notice, the main controlling section 201 begins operation responding to the request made by the user. More specifically, the main controlling section 201 notifies the image data conversion processing section 209 of the contents described in the necessary image data file format designating email 900'.

The image data designation section 301 of the image data conversion processing section 209 receiving the notice from the main controlling section 201 selects the image data corresponding to the image data information selected by the user out of the image data stored in the image data storing section 205, and output the selected image data to the image data conversion section 303.

The conversion format designation judgment section 302 of the image data conversion processing section 209 receiving the notice from the main controlling section 201 judges the file format designated by the user and notifies the image data conversion section 303 of the judgment consequence.

The image data conversion section 303 receiving the entry of the image data selected by the user and the notice of the file format designated by the user, converts the entered image data in the BMP format into the data in any file format among the PDF format, the JPEG format, and the TIFF format, as notified from the conversion format designation judgment section 302.

The main controlling section 201 attaches the image data converted by the image data conversion section 303 to an email to be sent to the user, and sends the email to the external PC 211 via the I/F controlling section 206 (step S1104 in FIG. 10). This email also can be composed at the email producing section 213 as described below.

FIG. 13 shows an example of the email attaching the image data to be sent at that time. The image data attaching email 1000 is constituted of a to (address) box 1001, a subject box 1002, an image data name column 1004, a stored date column 1005, a file format column 1007, and an attached image data icon 1010.

The to box 1001 is entered with an address "pc211@*.com" as the email receiving address of the user at the PC 211. The subject box 1002 is entered with the term "designated image attached email" representing the attachment of the image data in the file format designated by the user to the email sent by the MFP 1'**.

The image data name column 1004 has a cell including the name corresponding to the image data attached to the image data attaching email 1000, and normally, displays the same name as the name in the image data name column 904 of the stored image data list notifying mail 900.

The stored date column 1005 has a cell displaying date information such as, e.g., stored date on which the original image data before file format change of the image data attached to the image data attaching mail 1000 are stored in the image data storing section 205, edited date of the original image data, or changed data of the original image data names. The cell of the stored date column 1005 normally displays the same date information as the stored date of the stored image date list notifying mail 900.

The file format column 1007 has a cell indicating the file format of the image data attached to the image data attaching mail 1000 and designated by the user, and in a normal situation, displays the file format designated by the user at the pull down menu of the file format designation pull down menu column 907 on the stored image data list notifying email 900.

The attached image data icon 1010 is an icon displaying the image data in a prescribed file format, e.g., JPEG format, attached to the image data attaching mail 1000.

The user at the last stage can obtain the image data converted with the desired file format by receiving the image data attaching mail 1000 via the external PC 211 (step S1105 in FIG. 10).

Although it is exemplified that the number of the image data selected by the user is single in this embodiment, this invention is not limited to this, and plural number of the image data can be selected on the check box of the image data selection check box column 906' of the necessary image data file format designating email 900' to designate the desired file format or formats, thereby allowing the user to obtain the image data of plural files in the desired file format or formats at the same time.

As described above, according to the second embodiment, in addition to the advantages in the first embodiment, because the user can know in advance the image data size where the image data stored in the apparatus are converted into the data in a prescribed format or formats, the usability for the user can be further improved.

Although in the embodiments described above, MFPs are exemplified, the invented apparatus is not limited to this, and is applicable to any other image processing apparatuses such as, e.g., personal computers, printers, facsimile machines, scanners, and photocopiers. Moreover, although in the embodiments described above, BMP, JPEG, TIFF, PDF are exemplified as image file formats, the image files handled by the invented apparatus are not limited to those file formats, and the invented apparatus can handle any other applicable image file formats.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus comprising:
    an image data storing unit for storing image data in a prescribed file format;
    an image data information producing unit for producing image data information of the image data stored in the image data storing unit upon receipt of an information requesting email from an external apparatus, wherein the image data information includes selection information for selecting any of a plurality of file formats;
    an email producing unit for producing an information providing email added with the image data information;
    a transmitting unit for transmitting the information providing email to the external apparatus;
    a receiving unit for obtaining a responding email to the information providing email from the external apparatus, wherein the responding email includes selection reply information having a file format selected among the plurality of file formats based on the selection information; and
    an image data converting unit for converting the image data into the selected file format based on the selection reply information included in the responding email,
    wherein the transmitting unit transmits an email to which a file of the image data converted at the image data converting unit is attached to the external apparatus.

2. The image processing apparatus according to claim 1, wherein the image data storing unit stores the image data in the BMP format.

3. The image processing apparatus according to claim 1, wherein the plurality of file formats include at least one of PDF format, JPEG format, TIFF format, and BMP format.

4. The image processing apparatus according to claim 1, further comprising an image data size retrieving unit for retrieving image data size information corresponding to each file format of the image data, wherein the image data information includes the selection information and the image data size information.

5. The image processing apparatus according to claim 4, wherein the image data information is information for displaying options for file format and image data size corresponding to each file format in an email opened at the external apparatus based on the selection information and the image data size information.

6. The image processing apparatus according to claim 1,
    wherein the image data information includes designation information for designating a string,
    wherein the responding email includes designation reply information including the string designated based on the designation information, and
    wherein the image data converting unit converts only the image data of a page including the designated string into the file format based on the designation reply information included in the responding email.

* * * * *